3,069,421
PROCESS FOR THE PREPARATION OF Δ⁵⁽¹⁰⁾-ES-
TRENE-17β-OL-3-ONE AND INTERMEDIATES
Gérard Nominé, Noisy-le-Sec, and Robert Bucourt,
Clichy-sous-Bois, France, assignors to Roussel-UCLAF,
S.A., Paris, France, a corporation of France
No Drawing. Filed Apr. 9, 1962, Ser. No. 185,859
Claims priority, application France Apr. 12, 1961
9 Claims. (Cl. 260—239.55)

The present invention relates to an improved process for the production of Δ⁵⁽¹⁰⁾-estrene-17β-ol-3-one and to the intermediates produced by the process.

The compound, Δ⁵⁽¹⁰⁾-estrene-17β-ol-3-one, having the Formula I:

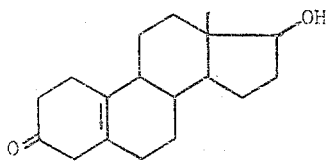

is of considerable interest as an intermediate in the synthesis of various steroids. According to United States Patent No. 2,806,862, both Δ⁴-estrene-10,17-diol-3-one and Δ⁴-estrene-10-ol-3,17-dione may be prepared starting from Δ⁵⁽¹⁰⁾-estrene-17β-ol-3-one. In addition, according to United States Patent No. 2,806,030, 17α-ethynyl-19-nor-testosterone can be produced using as an intermediate the ethylene ketal of Δ⁵⁽¹⁰⁾-estrene-17β-ol-3-one. Finally, Δ⁵⁽¹⁰⁾-estrene-17β-ol-3-one may be used as a starting compound in the synthesis of A-nor-B-homo steroids or in the synthesis of nor-ethynodrel.

Compound I, Δ⁵⁽¹⁰⁾-estrene-17β-ol-3-one has, however, up to the present time, been available only when prepared from ethers of estradiol or from other steroids of the estradiol series. This synthesis involves subjecting a steriod compound having an aromatic A ring to a reduction of the Birch type (see Soc., 1944, page 430) to give a 5,10-dehydro-3-ketonic derivative. Such a type of preparation, from the very start, is quite difficult, involving many purification steps and low yields. Moreover, the starting compounds are natural steroids which are relatively expensive.

An object of the present invention is the development of a process for the production of Δ⁵⁽¹⁰⁾-estrene-17β-ol-3-one starting from a synthetically produced steriod intermediate.

Another object of the invention is the production of the intermediate cyclic ketals of the formula:

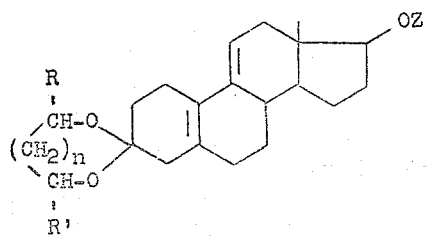

wherein R and R' represent radicals selected from the group consisting of hydrogen and alkyl, n represents an integer selected from the group consisting of 0 and 1 and Z represents a radical selected from the group consisting of hydrogen and the acyl group of an organic carboxylic acid having from 1 to 18 carbon atoms.

These and other objects of the invention will become more apparent as the description thereof proceeds.

According to the process of the invention Δ⁵⁽¹⁰⁾-estrene-17β-ol-3-one is prepared from Δ⁴,⁹-estradiene-17β-ol-3-one and esters thereof with organic carboxylic acids having from 1 to 18 carbon atoms. Δ⁴,⁹-estradiene-17β-ol-3-one and its esters can be obtained by a process of total synthesis as has been described by Velluz et al., Angewandte Chemie, 72, 725–30 (1960).

The process of the invention thus has the considerable advantage of starting from products produced by a total synthesis and therefore avoiding the use of starting materials accessible only from natural sources of steroids.

The process, object of the invention, is shown schematically in the flow diagram of Table I.

TABLE I

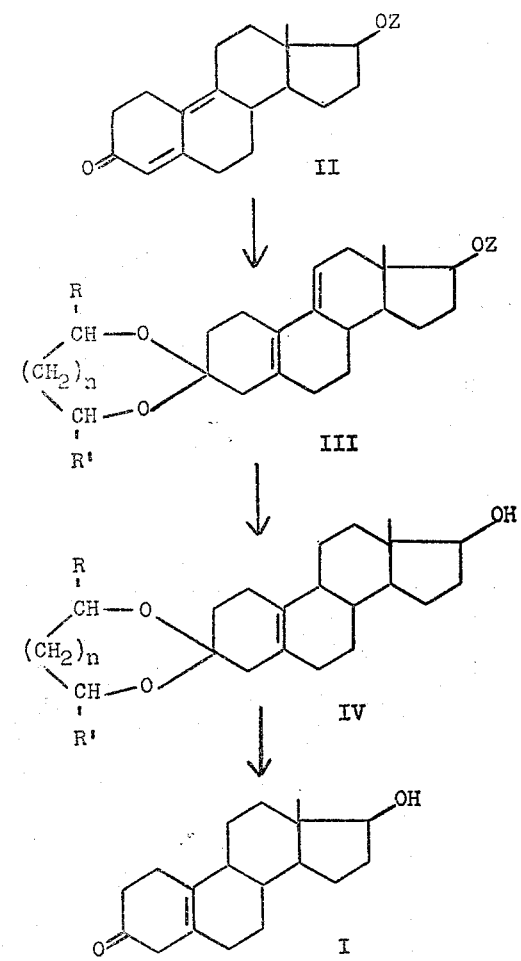

wherein R and R' represent a radical selected from the group consisting of hydrogen and alkyl, n represents an integer selected from the group consisting of 0 and 1, and Z represents a radical selected from the group consisting of hydrogen and the acyl group of an organic carboxylic acid having from 1 to 18 carbon atoms.

The process consists essentially in the steps of—
(a) Reacting a compound having the formula:

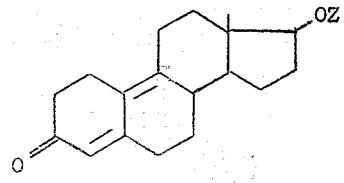

wherein Z represents a member of the group consisting of hydrogen and the acyl group of an organic carboxylic acid having from 1 to 18 carbon atoms with a ketalizing compound selected from the group consisting of:

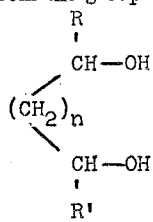

and ketal ethers thereof, wherein R and R' are selected from the group consisting of hydrogen and alkyl and $n$ represents an integer selected from the group consisting of 0 and 1, under ketalizing conditions, (b) Selectively hydrogenating the 9(11) double bond of the compound having the formula:

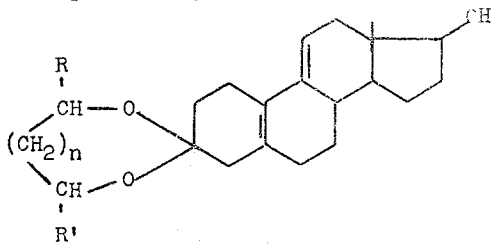

wherein R, R' and $n$ have the above-assigned meanings, (c) Liberating the ketone in the 3 position of the compound having the formula:

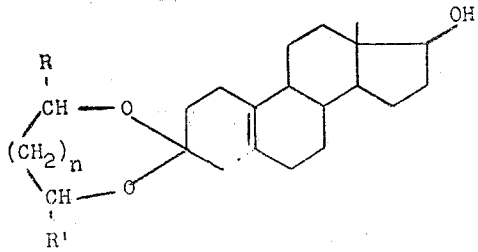

wherein R, R' and $n$ have the above-assigned meanings, and (d) Recovering said $\Delta^{5(10)}$-estrene-17β-ol-3-one.

For the starting compound, either $\Delta^{4,9}$-estradiene-17β-ol-3-one or its esters may be employed. The starting compound may be esterified with any organic carboxylic acid having 1 to 18 carbon atoms. Preferably hydrocarbon carboxylic acids are employed such as alkanoic acids, for example acetic acid and trimethylacetic acid; alkenoic acids; aralkanoic acids, for example phenylacetic acid; cycloalkylalkanoic acids, for example cyclopentylacetic acid; benzene carboxylic acids, for example benzoic acid; and cycloalkane carboxylic acids, for example hexahydrobenzoic acid; etc.

The transformation of $\Delta^{4,9}$-estradiene-17β-ol-3-one, compound of Formula II, into the ketal of Formula III is produced by the reaction of either an α-glycol or a β-glycol or by a double exchange of functions by the action of the corresponding dioxolane while operating in the presence of a strong acid catalyst such as, for example, p-toluene sulfonic acid under ketalization conditions.

The ketalization causes a migration of the double bond system. The two double bonds in the 4 and 9 positions of the starting compounds migrate respectively into the 5(10) and 9(11) positions.

While any α-glycol or β-glycol having the formula:

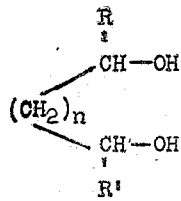

or ketal ethers thereof where R and R' are hydrogen or alkyl, preferably lower alkyl, may be utilized in the ketalization step, it is advantageous to prepare, as the ketal of Formula III, the 3-ethylene ketal. The 3-ethylene ketal is preferred because of the ease with which the reaction is effected in this case and the very elevated yields which it furnishes. Where the starting compound of Formula II has an ester in the 17β position, it is necessary to saponify this ester function after ketalization of the ketone in the 3 position. This saponification is easily realized by the action of an alkaline base, preferably an alkali metal hydroxide such as potassium hydroxide in aqueous or water-alcoholic solution.

One of the more important characteristics of the present invention is the selective reduction of the 9(11) double bond of the compound of Formula III. This reduction is preferably executed by catalytic hydrogenation utilizing as hydrogenation catalyst, one derived from palladium or platinum, and the yields of this step of the procedure approach the theoretical. It is preferable to utilize an alkaline form of the catalyst, such as palladium hydroxide or platinum hydroxide.

The liberation of the ketone in the 3 position of the reduced product (Compound IV) is caused by action of an organic acid such as, for example, acetic acid in the presence of water at about room temperature. It is advantageous to operate in the presence of a relatively concentrated acidic agent, preferably in a reaction media which contains only a very small amount of water.

The following examples are illustrative of the invention. It should be understood however that the invention is not limited to these specific embodiments. Other expedients known to those skilled in the art may be employed.

EXAMPLE I

*Preparation of $\Delta^{5(10)}$-Estrene-17β-Ol-3-One*

STEP A.—3 - ETHYLENEDIOXY - 17β - BENZOYLOXY-$\Delta^{5(10),9(11)}$-ESTRADIENE (COMPOUND III WITH R=R'=H, $n$=0, AND Z=C₆H₅CO)

2.9 g. of 17β-benzoyloxy-$\Delta^{4,9}$-estradiene-3-one, obtained according to copending, commonly-assigned United States patent application Serial No. 57,136, filed September 20, 1960, were introduced into 100 cc. of 2-methyl-2-ethyl-1,3-dioxolane. 60 mg. of p-toluene sulfonic acid were added thereto and the mixture was heated to reflux under an atmosphere of nitrogen for a period of 2 hours. After cooling the mixture was poured into water containing bicarbonate and extracted with methylene chloride. The extracts were washed with water, dried over potassium carbonate, then evaporated to dryness under vacuum.

3.378 g. of 3-ethylenedioxy-17β-benzoyloxy-$\Delta^{5(10),9(11)}$-estradiene were obtained, a quantitative yield, which were utilized as such for the next step of the synthesis.

This compound is not described in the literature.

STEP B.—3-ETHYLENEDIOXY-$\Delta^{5(10),9(11)}$-ESTRADIENE-17β-OL (COMPOUND III WITH R=R'=H, $n$=0, AND Z=H)

The following mixture was heated to reflux under an atmosphere of nitrogen:

3 - ethylenedioxy - 17β - benzoyloxy - $\Delta^{5(10),9(11)}$ - estradiene _____ g__ 1.2
Methylene chloride _____ cc__ 24
Methanol _____ cc__ 144
Potassium hydroxide solution (containing 675 g./l.) _____ cc__ 3.6

The heating was maintained for a period of one hour, then the solution was evaporated to dryness under vacuum. The residue was taken up in 120 cc. of methylene chloride and 60 cc. of water and decanted. The aqueous phase was extracted with methylene chloride. The organic phases were combined, washed with water, dried and evaporated to dryness under vacuum. 0.825 g. of 3 - ethylenedioxy - $\Delta^{5(10),9(11)}$ - estradiene - 17β - ol were obtained (being a yield of 92%) which were utilized without purification for the next step of the synthesis. This compound is not described in the literature.

STEP C.—3 ETHYLENEDIOXY-Δ5(10)-ESTRENE-17β-OL
(COMPOUND IV WITH R=R'=H AND n=0)

500 mg. of 3 - ethylenedioxy - Δ5(10),9(11) - estradiene-17β-ol were dissolved in 25 cc. of methanol. 55 mg. of a catalyst comprising palladium hydroxide deposited on strontium carbonate (the preparation of which is indicated below) were added. Then the mixture was hydrogenated. One mol of hydrogen was absorbed.

The solution was filtered, the filtrate was evaporated to dryness under vacuum and 490 mg. of 3-ethylenedioxy-Δ5(10)-estrene-17β-ol were obtained (being a yield of 98.5%).

*Preparation of the Catalyst*

50 g. of strontium carbonate were placed in suspension in 200 cc. of distilled water. 45 cc. of a solution containing 20% palladium chloride was added. The mixture was agitated 5 minutes and brought to a pH of 8 by very slow addition of N sodium hydroxide solution. The suspension was vacuum filtered, washed with water and dried at 80° C. overnight.

STEP D.—Δ(5(10))-ESTRENE-17β-OL-3-ONE (COMPOUND I)

490 mg. of 3 - ethylenedioxy - Δ5(10) - estrene - 17β-ol were dissolved in 5 cc. of a 75% acetic acid solution and the solution agitated under an atmosphere of nitrogen at room temperature for a period of five hours. The mixture was poured into water saturated with sodium bicarbonate and extracted with methylene chloride. The extracts were combined, evaporated to dryness under vacuum and Δ5(10) - estrene - 17β - ol - 3 - one was obtained as the residue. For purification, this residue was recrystallized from hot ethyl acetate. 90 mg. (being 21%) of Δ5(10) - estrene - 17β - ol - 3 - one were obtained. The product melted at 199° C. The I.R. spectra confirmed its structure.

EXAMPLE II

*Preparation of Δ5(10)-Estrene-17β-Ol-3-One (I) Starting From Δ4,9-Estradiene-17β-Ol-3-One (II With Z=H)*

1 gm. of Δ4,9-estradiene-17β-ol-3-one, obtained according to United States Patent No. 3,020,296, was introduced into 20 cc. of methyl-ethyl-dioxolane. 20 mg. of p-toluene sulfonic acid were added thereto and the mixture was heated to reflux for a period of one hour.

A further 15 cc. of methyl-ethyl-dioxolane was added, then very slowly about 20 cc. of solvent was distilled off. The reaction solution was poured into 20 cc. of water saturated with sodium bicarbonate. The organic phase was decanted, washed until the wash waters were neutral, then evaporated to dryness under vacuum. The residue was dissolved in 20 cc. of methylene chloride and subjected to chromatography over magnesium silicate. Elution with methylene chloride containing 2% acetone supplied 3-ethylene-dioxy-Δ5(10)9,(11)-estradiene-17β-ol with a yield of 89%.

The product occurred in the form of an amorphous white solid having a specific rotation [a]$_D^{20}$=+133° (C=1% chloroform). It was very soluble in alcohol, acetone, ether, benzene and chloroform and insoluble in water, isopropyl ether and petroleum ether.

U.V. spectra (in ethanol):

λ inflection=237 mμ, $E_{1cm.}^{1\%}$=497

λ maximum=242 mμ, $E_{1cm.}^{1\%}$=531

λ inflection=250 mμ, $E_{1cm.}^{1\%}$=375

The product, which was identical to the compound obtained in Example I, Step B, was next transformed according to the method of operation described in Example I, Steps C and D above into Δ5(10)-estrene-17β-ol-3-one.

The preceding examples are not to be construed as limiting the invention. It is evident to one skilled in the art that temperatures, the nature of the solvents, the acid hydrolyzing agents, or the organic carboxylic acid ester may be varied or that equivalent techniques may be used without departing from the spirit of the invention or the scope of the appended claims.

We claim:
1. The intermediate cyclic ketals of the formula

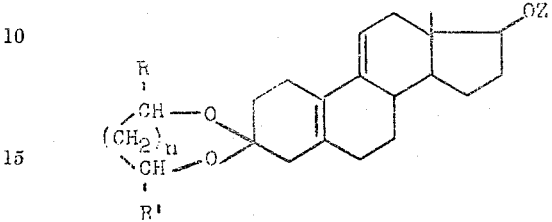

wherein R and R' represent radicals selected from the group consisting of hydrogen and alkyl, n represents an integer selected from the group consisting of 0 and 1 and Z represents a radical selected from the group consisting of hydrogen and the acyl group of an organic carboxylic acid having from 1 to 18 carbon atoms.

2. 3-ethylenedioxy-Δ5(10),9(11)-estradiene-17β-ol.

3. 3 - ethylenedioxy - 17β - benzoyloxy - Δ5(10),9(11)-estradiene.

4. The process of preparing Δ5(10)-estrene-17β-ol-3-one which comprises the steps of (a) reacting a compound having the formula

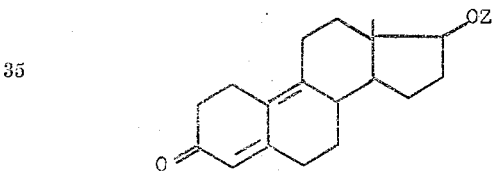

wherein Z represents a member of the group consisting of hydrogen and the acyl group of an organic carboxylic acid having from 1 to 18 carbon atoms with a ketalizing compound selected from the group consisting of

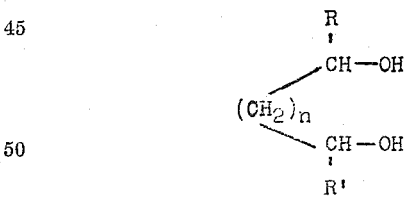

and ketal ethers thereof, wherein R and R' are selected from the group consisting of hydrogen and alkyl and n represents an integer selected from the group consisting of 0 and 1, in the presence of a strong acid catalyst (b) selectively hydrogenating the 9(11) double bond of the compound having the formula

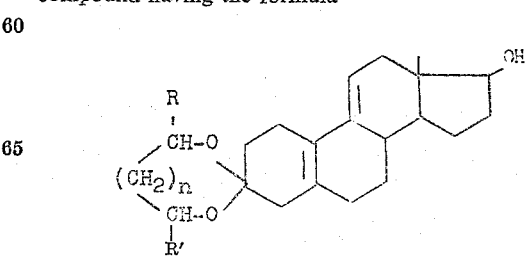

wherein R, R' and n have the above-assigned meanings by subjecting the aforesaid Δ9(11) compound to the action of hydrogen in the presence of a hydrogenation catalyst selected from the group consisting of palladium and platinum, (c) liberating the ketone in the 3 position of the compound having the formula

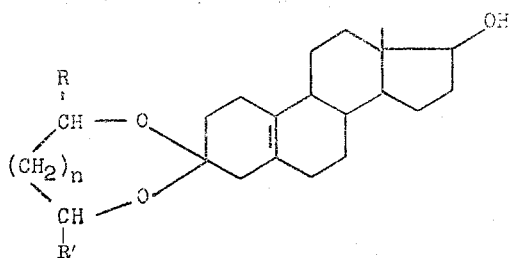

wherein R, R' and n have the above-assigned meanings by the action of an acid in the presence of water, and (d) recovering said $\Delta^{5(10)}$-estrene-17β-ol-3-one.

5. The process of claim 4 wherein the starting compound is $\Delta^{4,9}$-estradiene-17β-ol-3-one.

6. The process of claim 4, wherein the starting compound is 17β-benzoyloxy-$\Delta^{4,9}$-estradiene-3-one and after the ketalization step the 17β-ester is saponified to the free hydroxyl compound.

7. The process of claim 4, wherein 2-methyl-2-ethyl-1,3-dioxolane is employed as said ketalizing compound.

8. The process of producing $\Delta^{5(10)}$-estrene-17β-ol-3-one which comprises the steps of reacting $\Delta^{4,9}$-estradiene-17β-ol-3-one with 2-methyl-2-ethyl-1,3-dioxolane in the presence of an acidic catalyst, subjecting the 3-ethylenedioxy-$\Delta^{5(10),9(11)}$-estradiene-17β-ol to the action of hydrogen in the presence of a palladium hydrogenation catalyst, reacting the 3-ethylenedioxy-$\Delta^{5(10)}$-estrene-17β-ol with concentrated aqueous acetic acid and recovering said $\Delta^{5(10)}$-estrene-17β-ol-3-one.

9. The process of producing $\Delta^{5(10)}$-estrene-17β-ol-3-one which comprises the steps of reacting 17β-benzoyloxy-$\Delta^{4,9}$-estradiene-3-one with 2-methyl-2-ethyl-1,3-dioxolane in the presence of an acidic catalyst, reacting the 3 - ethylenedioxy - 17β - benzoyloxy - $\Delta^{5(10),9(11)}$-estradiene with an aqueous alcoholic solution of an alkali metal hydroxide, subjecting the 3-ethylenedioxy-$\Delta^{5(10),9(11)}$-estradiene-17β-ol to the action of hydrogen in the presence of a palladium hydrogenation, catalyst, reacting the 3-ethylenedioxy-$\Delta^{5(10)}$-estrene-17β-ol with concentrated aqueous acetic acid and recovering said $\Delta^{5(10)}$-estrene-17β-ol-3-one.

No references cited.